United States Patent
Jha et al.

(10) Patent No.: US 11,562,299 B2
(45) Date of Patent: Jan. 24, 2023

(54) WORKLOAD TENURE PREDICTION FOR CAPACITY PLANNING

(71) Applicant: VMware, Inc., Palo Alto, CA (US)

(72) Inventors: Chandrashekhar Jha, Bangalore (IN); Ritesh Jha, Bangalore (IN); Yash Bhatnagar, Bangalore (IN); Rajat Garg, Bangalore (IN); Rachil Chandran, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 874 days.

(21) Appl. No.: 16/444,190

(22) Filed: Jun. 18, 2019

(65) Prior Publication Data

US 2020/0401947 A1    Dec. 24, 2020

(51) Int. Cl.
*G06F 15/16*    (2006.01)
*G06N 20/10*    (2019.01)
*G06F 9/455*    (2018.01)

(52) U.S. Cl.
CPC ......... *G06N 20/10* (2019.01); *G06F 9/45558* (2013.01); *G06F 2009/4557* (2013.01)

(58) Field of Classification Search
CPC ............... G06N 20/10; G06F 9/45558; G06F 2009/4557
See application file for complete search history.

(56) References Cited

U.S. PATENT DOCUMENTS

| | | | |
|---|---|---|---|
| 2008/0244579 A1* | 10/2008 | Muller | G06F 9/48 718/100 |
| 2014/0214880 A1* | 7/2014 | Chi | G06F 16/2453 707/768 |
| 2015/0287057 A1* | 10/2015 | Baughman | H04L 41/147 705/7.31 |
| 2017/0242625 A1* | 8/2017 | Pandurangan | G06F 3/0659 |
| 2017/0366398 A1* | 12/2017 | Mizrachi | H04L 41/0816 |
| 2018/0101313 A1* | 4/2018 | Chen | G06F 3/0653 |
| 2018/0203728 A1* | 7/2018 | Yan | G06F 11/0757 |
| 2018/0225137 A1* | 8/2018 | Bianchini | G06F 9/5083 |
| 2018/0225149 A1* | 8/2018 | Bianchini | G06F 9/45558 |
| 2018/0278485 A1* | 9/2018 | Lugones | H04L 49/70 |
| 2019/0163517 A1* | 5/2019 | Fontoura | G06F 9/5005 |
| 2019/0317788 A1* | 10/2019 | Lang | G06N 20/00 |
| 2020/0012526 A1* | 1/2020 | Bianchini | G06F 9/5077 |
| 2020/0117494 A1* | 4/2020 | Cortez | G06F 9/4856 |
| 2020/0301723 A1* | 9/2020 | Gabrielson | H04L 41/22 |
| 2020/0364071 A1* | 11/2020 | Chopra | G06F 9/505 |
| 2020/0387393 A1* | 12/2020 | Xu | G06N 20/00 |
| 2021/0271507 A1* | 9/2021 | Matthew | G06F 9/5077 |

* cited by examiner

*Primary Examiner* — Hieu T Hoang
(74) *Attorney, Agent, or Firm* — Thomas Horstemeyer, LLP

(57) ABSTRACT

Disclosed are various embodiments for automating the prediction of workload tenures in datacenter environments. In some embodiments, parameters are identified for a plurality of workloads of a software defined data center. A machine learning model is trained to determine a predicted tenure based on parameters of the workloads. A workload for the software defined data center is configured to include at least one workload parameter. The workload is processed using the trained machine learning model to determine the predicted tenure. An input to the machine learning model includes the at least one workload parameter.

20 Claims, 3 Drawing Sheets

WORKLOAD TENURE PREDICTION FOR CAPACITY PLANNING

BACKGROUND

Enterprises can employ software defined datacenters in order to provide compute, memory, storage, network, and other resources for enterprise workloads. The workloads, which can be embodied in applications or virtual machines, can represent demands for the software defined datacenter. Capacity for the software defined datacenter is based on the physical hosts that provide resources. The hosts can include compute, memory, storage, network, and other resources that are utilized for the enterprise workloads.

Capacity planning is a challenging problem that datacenter administrators or managers face in their day to day jobs. The administrator can add and remove demands as well as add and remove capacity for the datacenter. When an administrator adds demand, resource requirements for the currently running and upcoming workloads or applications can be computed. However, the resource requirement calculations are predictive and can be inaccurate or misleading based on the assumptions made in resource calculations. Existing solutions can utilize the current capacity and current workloads to identify whether the capacity is sufficient for current workloads.

However, this manner of capacity planning does not provide for workloads that are implemented in the future. In addition, where capacity planning considers workloads to be implemented in the future, they can fail to consider the actual life cycle of individual workloads. Accordingly, more accurate capacity planning technologies are needed. More accurate capacity planning technologies are more efficient for administrators to use, as they will not have to update capacity as frequently when predicted capacity is accurate.

BRIEF DESCRIPTION OF THE DRAWINGS

Many aspects of the present disclosure can be better understood with reference to the following drawings. The components in the drawings are not necessarily to scale, with emphasis instead being placed on clearly illustrating the principles of the disclosure. Moreover, in the drawings, like reference numerals designate corresponding parts throughout the several views.

DETAILED DESCRIPTION

Figure 1:
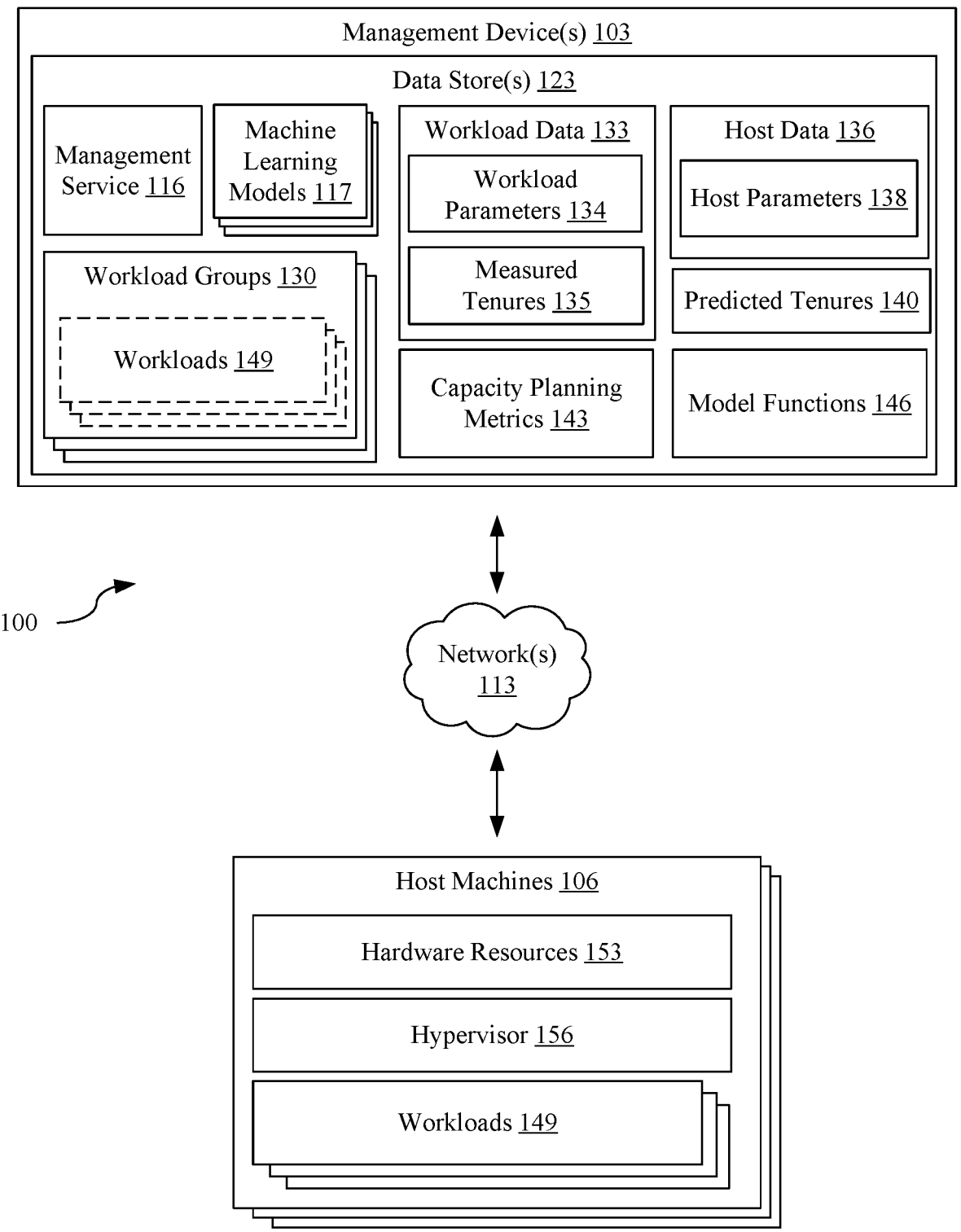
FIG. 1 is a drawing of an example of a networked environment according to various embodiments of the present disclosure.

Disclosed are various approaches for automatically predicting workload tenures for capacity planning in a software defined datacenter. Workload tenure predictions can be made by analyzing life cycles for workloads that are currently executed in a software defined datacenter, as well as workloads that have completed their lifecycles. The analysis can be performed using various machine learning approaches as discussed in further detail below. As a result, an accurate estimate for the window of operation or tenure for a workload can be predicted for capacity planning.

Capacity planning for a datacenter can involve an analysis of capacity and demand of the datacenter. Capacity can refer to the resources provided by host machines that are utilized by the software defined datacenter. Demand can refer to resources consumed or reserved by workloads of the datacenter. Workloads can include applications and other instructions implemented using a virtual machine. Capacity planning can be effective for a specified planning cycle, which can represent a time period that is relevant to the administrator, the enterprise, or other users. The planning cycle can be monthly, quarterly, yearly, and other time periods. Through a user interface such as an administrative console, a user can select various options such as adding workloads and other resource demands. When configuring a workload, a user can enter certain parameters of the workload, or parameters of a virtual machine implementing the workload. The console can also allow a user to add resource capacity by adding hosts to the software defined datacenter.

Accurately predicting the workload tenure, or the duration of time that a workload will be utilized in a software defined datacenter, has a number of benefits to datacenter operators, hosted service providers, cloud computing providers, and in-house information technology (IT) departments. While the user enters an implementation time for a workload, the duration of its lifecycle can be unknown to the user. The user might not know how long an automatic process takes to complete in the datacenter, or might not be personally involved in manual processes performed by other users of the new virtual machine. As a result, the user does not know when a particular workload will be decommissioned. Moreover, existing capacity planning can automatically assume that the workload will run until the end of the planning cycle. This inaccurate capacity planning can overestimate future demands, and can result in administrators repeatedly readjusting allocated capacity. By predicting the workload tenure of a virtual machine implementing the workload, the systems and methods described can increase the efficiency of administrators using systems and devices implementing capacity planning services. The present disclosure describes systems and methods for prediction of workload tenures based on the tenures of similar virtual machines currently and previously executed in the datacenter.

FIG. 1 depicts a networked environment 100 according to various embodiments. The networked environment 100 includes a management device 103, and one or more host machines 106, which are in data communication with each other via a network 113. The network 113 can include wide area networks (WANs) and local area networks (LANs). These networks 113 can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The management device 103 can include a server computer or any other system providing computing capability. In some instances, however, the management device 103 can be representative of a plurality of computing devices used in a distributed computing arrangement, such as a server bank, computer bank, or combination of multiple server banks or computer banks. When using a plurality of computing devices in a distributed computing arrangement, individual management devices 103 may be located in a single installation or may be distributed across multiple installations.

The management device 103 can be configured to execute various applications or components to manage the operation of the host machines 106. For example, the management device 103 can be configured to execute a management service 116 and other applications.

The management service 116 can perform various functions related to the operation of the devices in the networked environment 100. For example, the management service 116 can collect data from the host machines 106 in data communication with the management device 103. Likewise, the management service 116 can configure host machines 106. Similarly, the management service 116 can also be executed to send commands to host machines 106 to perform specified actions. Configuration may be performed, or commands may be sent, in response to user input provided through a management console of the management service 116.

The management service 116 can provide an administrative interface for configuring the operation of individual components in the networked environment 100. For instance, the management service 116 can provide an administrative interface for the management service 116. As an example, the management service 116 can provide a user interface to allow an administrative user to request a predicted amount of time for a maintenance window that would begin at a user specified time. Accordingly, the management console can correspond to a web page or a web application provided by a web server hosted in the computing environment 100 in some implementations. In other implementations, however, the management console can be implemented as a dedicated or standalone application.

Also, various data can be stored in a data store 123 that is accessible to the management device 103. The data store 123 can be representative of a plurality of data stores 123, which can include relational databases, object-oriented databases, hierarchical databases, hash tables or similar key-value data stores, as well as other data storage applications or data structures. The data stored in the data store 123 is associated with the operation of the various applications or functional entities described below. This data can include the management service 116, machine learning models 117, workload groups 130, workload data 133, host data 136, predicted tenures 140, as well as capacity planning metrics 143 including demand metrics and capacity metrics.

The machine learning models 117 can include linear regression, logistic regression, Poisson regression, generalized linear regression, ordinary least squares regression, random forest regression, support vector machine (SVM) regression, and other regression models. While referred to as regression models, these models can also be utilized for classification or grouping of workloads 149 into workload groups 130. A workload 149 can include applications, processes, and other instructions implemented by a virtual machine or a group of virtual machines.

The management service 116 can utilize the machine learning models 117 to determine a predicted tenure 140 for a new workload 149. For example, in the case of a regression machine learning model 117, the management service 116 can generate a model function 146 between measured tenures 135 and a number of workload parameters 134. The model function 146 can be a function that includes tenure as a response variable and the workload parameters 134 as predictor variables. The machine learning model 117 can utilize a training set of workloads 149 to develop the model function 146 based on the measured tenures 135 and workload parameters 134. The machine learning model 117 finds a model function 146 that results in predicted tenures 140 with minimum deviation from measured tenures 135. When a new workload 149 is configured, its parameters can be input into the model function 146 in order to generate a predicted tenure 140.

When viewed as a classification scenario, workloads 149 can be separated into workload groups 130 based on an analysis of workload parameters 134 and measured tenures 135 of current and completed workloads 149. The workload groups 130 can include groups of workloads 149 that are grouped based on the machine learning models 117. In some cases, each workload group 130 can be associated with a group tenure based on the respective measured tenures 135 of the workloads 149 within the workload group 130. The group tenure can also be an average, median, mode, rounded value, or another value calculated based on the measured tenures 135 of workloads 149 in the workload group 130. When a new workload 149 is configured, the management service 116 can associate the new workload 149 with a particular workload group 130. The workloads 149 of the particular workload group 130 can be analyzed to determine a predicted tenure 140 for the new workload 149.

The predicted tenure 140 can be utilized to generate capacity planning metrics 143 such as resource demands, expected available capacities, resource shortfalls, and other metrics. The capacity planning metrics 143 can be utilized in a user interface that incorporates graphs and other visual representations of the capacity planning metrics 143. Capacity planning metrics 143 can be calculated for a particular host, a particular cluster, group of clusters, or an entire software defined datacenter.

The workload data 133 can include workload parameters 134, and measured tenures 135. The management service 116 can receive a data structure or file from the host machines 106, and workload data 133 can be determined from the data structure. In some cases, the workload parameters 134 can include the measured tenure 135. In those examples, the hypervisor 156 can determine the measured tenure 135 of the workload 149. The measured tenure 135 can also be identified by the management service 116 based on times when a workload is initially implemented and when the workload is removed from a host machine 106.

The workload parameters 134 can include software configuration parameters, hardware resource parameters, network parameters, and other parameters of workloads 149. Software configuration parameters can include a workload identifier (e.g., universal unique identifier UUID), an operating system identifier, a thin provisioning indicator, a fault tolerance indicator, a custom tag value, a management service tag value (e.g. vSphere tag value), a VM template identifier, parent cluster identifier, parent host identifier, parent datacenter identifier, a power state, and a connection state. Hardware resource parameters can include a number of virtual CPUs (vCPUs), an amount of random access memory (RAM) or other memory parameters, an amount of hard disk space or storage data parameters, a number of network interface controllers (NICs), a required CPU model, a required CPU speed, a CPU reservation, a CPU limit, CPU shares, and memory shares. Network parameters can include a MAC address, an IP address, a subnet mask, and a default gateway. The management service 116 can use the workload data 133 to determine a CPU demand, a memory demand, a disk space demand, a network demand, and other capacity planning metrics 143 for a workload 149.

The host data 136 can include data collected from or reported by a respective host machine 106 as well as data about the host machine 106 itself. For example, the host data 136 can include host parameters 138, a capacity utilization history, and potentially other data. The host parameters 138 can include a host identifier, a hypervisor identifier of the hypervisor 156, a list of workloads 149 executed, and hardware resource parameters including an amount of RAM or memory installed, hard disk or data storage installed, a number of physical CPUs, a CPU model, a CPU speed, a number of network interfaces and other values. The hardware resource parameters can represent reported hardware resources 153 of the host machine 106. The host identifier can represent an identifier that uniquely identifies a host machine 106 with respect to other host machines 106. Examples of host identifiers can include serial numbers, media access control (MAC) addresses of network interfaces on the host machine 106, and machine names assigned to the host machine 106. The management service 116 can use the host data 136 to determine a CPU capacity, a memory capacity, a disk space capacity, a network capacity, and other capacity planning metrics for a workload 149. In addition, shortfalls and excesses can also be calculated, for example, based on a difference between capacities and demands.

The host data 136 can also include a utilization history that reflects the amount and type of computing resources of the host machine 106 that have been consumed on a historic basis. For example, at periodic intervals (e.g., every minute, every five minutes, every fifteen minutes, every thirty minutes, every hour, etc.), the host machine 106 can report the current resource usage of the host machine 106 capacity to the management service 116. The resource usage can include statistics such as the number of workloads 149 currently hosted by the hypervisor 156 on the host machine 106, the amount of RAM currently committed by the hypervisor 156 for the management of the hosted workloads 149, the current size of a storage cache, the amount of processor cycles currently consumed by the hypervisor 156 or individual workloads 149, and other relevant data.

The host machines 106 can include a server computer or any other system providing computing capability. Often, multiple host machines 106 may be located in a single installation, such as a datacenter. Likewise, host machines 106 located in multiple datacenters may also be in data communication through the network 113 with each other, and with the management device 103.

The host machine 106 can provide an operating environment for one or more workloads 149. Accordingly, a host machine 106 may have a hypervisor 156 installed to manage and coordinate the execution of any workloads 149 hosted by the host machine 106. To assist the operation of the hypervisor 156 or the workloads 149 hosted by the host machine 106, the host machine 106 may also maintain a storage cache.

The hypervisor 156, which may sometimes be referred to as a virtual machine monitor (VMM), is an application or software stack that allows for creating and running virtual machines. Accordingly, a hypervisor 156 can be configured to provide guest operating systems with a virtual operating platform, including virtualized hardware devices or resources, and to manage the execution of guest operating systems within a virtual machine execution space provided on the host machine 106 by the hypervisor 156. In some instances, a hypervisor 156 may be configured to run directly on the hardware of the host machine 106 in order to control and manage the hardware resources of the host machine 106 provided to the workloads 149 resident on the host machine 106. In other instances, the hypervisor 156 can be implemented as an application executed by an operating system executed by the host machine 106, in which case the workload 149 may run as a thread, task, process or virtual machine of the hypervisor 156 or operating system. Examples of different types of hypervisors include ORACLE VM SERVER™, MICROSOFT HYPER-V®, VMWARE ESX™ and VMWARE ESXi™, VMWARE WORKSTATION™, VMWARE PLAYER™, and ORACLE VIRTUALBOX®.

Although the management device 103 and the host machines 106 are depicted and discussed as separate devices, one or more of these devices could be executed as a workload 149 hosted by another computing device. For example, the functionality provided by the management device 103 could be implemented using a workload 149 executed by a host machine 106 in a datacenter or similar computing environment. Likewise, one or more network storage devices could be implemented as workloads 149 operating on a host machine 106.

Next, a general description of the operation of the various components of the networked environment 100 is provided. Although the following description provides one example of the operation of and the interaction between the various components of the networked environment 100, other operations or interactions may occur in various implementations.

A host machine 106 can be registered with the management service 116. For example, an administrative user may use the management service 116 to provide information about the host machine 106 to the management service 116, thereby notifying the management service 116 of the existence of the host machine 106. For example, the administrative user may provide a host identifier to the management service 116. In some instances, the administrative user may also configure the host machine 106 to communicate with the management service 116 using a management console.

The host machine 106 can report relevant usage and configuration data to the management service 116 at periodic intervals. For example, the host machine 106 may report a list of workloads 149 currently executing, as well as a list of applications currently installed and their versions, the current available hardware resources 153, the current resource utilization of the host machine 106, and various other data. As the workloads 149 are reported by the host machines 106 over time, the measured tenure 135 can be identified.

All of this data can be recorded by the management service 116 in the data store 123 as part of host data 136. After sufficient amounts of information have been collected over a sufficient period of time, the management service 116 can use various machine learning techniques to generate predicted tenure 140 for a new workload 149, or a period of time that the new workload 149 is likely to reside in the SDDC and execute on a host machine 106. The predicted tenure 140 can then be rendered within the user interface of the management service 116 for the benefit of the administrative user. The predicted tenure 140 can also be utilized to calculated capacity planning metrics 143, including graphs and other visualizations that represent forecasted capacities and demands. The visualizations can also include past and current capacities and demands.

Figure 2:
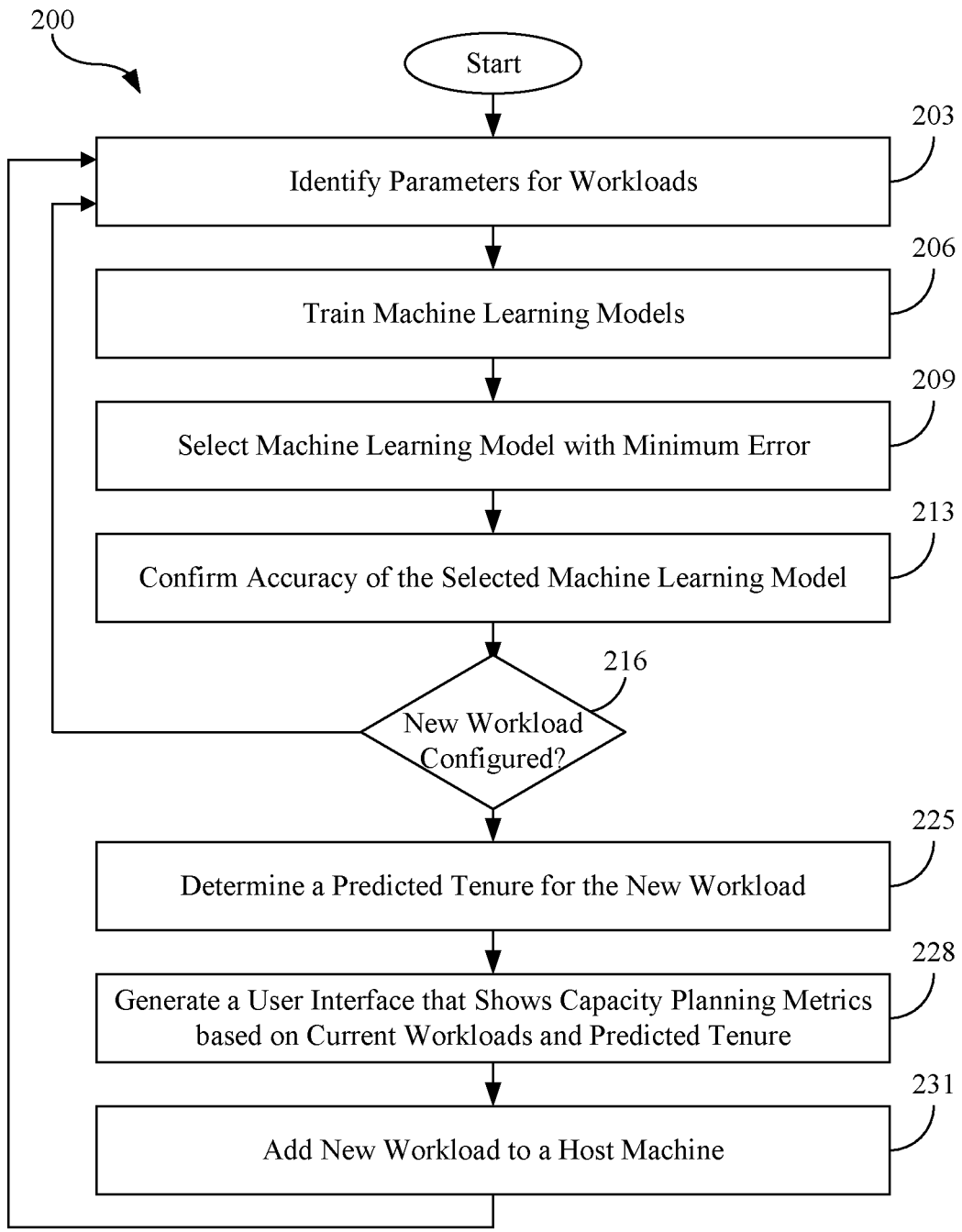
FIG. 2 is an example of a flowchart illustrating functionality implemented by various embodiments of the present disclosure.

Referring next to FIG. 2, shown is a flowchart 200 that provides one example of the operation of a portion of the management service 116. Generally, the flowchart 200 shows how the management service 116 can predict tenure for a new workload 149 and utilize this tenure to calculate demand for the new workload 149. The demand for the new workload 149 can be used when generating visualizations of capacity planning metrics 143 in a user interface or console of the management service 116.

In step 203, the management service 116 can identify workload parameters 134 and other workload data 133 for the workloads 149. The workloads 149 can include currently executing and previously executed (e.g., completed) workloads 149 from the software defined data center (SDDC), or a subset of the SDDC such as a host, a cluster, a group of clusters, or hosts for a particular department or subdivision of an enterprise. The management service 116 can collect workload data 133 based on reported files or other data structures received from the host machines 106. Table 1 as shown below, displays an example of parameters collected. In this example, each workload 149 is a virtual machine. In further examples, a workload 149 can refer to an application, instructions, or another portion of a virtual machine implementing a workload 149. Further, a workload 149 can refer to multiple virtual machines utilized in concert. The parameters listed in Table 1 can be associated with a particular workload 149 or virtual machine based on a unique identifier.

TABLE 1

| Parameter Name | Description |
| --- | --- |
| vCPUCount | Number of vCPUs required for the VM |
| osName | Operating system running on the VM |
| memoryGB | Configured memory capacity for the VM |
| reservedMemoryGB | Memory reservation for the VM |
| reservedCpuGhz | CPU reservation for the VM |
| faultTolerant | If the fault tolerant feature for this VM is enabled or not |
| nicCount | Number of network card required for the VM |
| thinProvisioned | It the storage for the VM is thin provisioned or not |
| Tenure | The tenure of the VM in days |

In some cases, the hypervisor 156 can determine the measured tenure 135 of the workload 149, and this data can be included in the data received from the host machine 106. The measured tenure 135 can also be identified by the management service 116 as a difference between a time the virtual machine is initially reported as implemented in a host machine 106, and a time that the workload is no longer reported as implemented in the host machine 106. An example of workload data 133 is provided in Table 2. Each row in Table 2 can represent the workload data 133 for a particular virtual machine or the workload 149.

TABLE 2

| vCpu Count | osName | reserved Memory GB | memory GB | Reserved CpuGhz | Fault Tolerant | Nic Count | Thin Provisioned | Tenure (days) |
| --- | --- | --- | --- | --- | --- | --- | --- | --- |
| 4 | Linux | 2 | 8 | 2 | false | 2 | true | 2 |
| 2 | Windows | 0 | 4 | 1 | true | 1 | true | 4 |
| 1 | Windows | 0 | 2 | 0 | false | 2 | false | 1 |
| 4 | Linux | 2 | 8 | 0 | false | 2 | true | 10 |
| 2 | Linux | 2 | 16 | 1 | true | 1 | false | 30 |
| 1 | Windows | 1 | 2 | 0 | false | 1 | false | 6 |

The data received from the host machines 106 can be in a numerical or non-numerical format. In some examples, a machine learning model or a particular implementation of the machine learning model can require a numerical formatting for each workload parameter. Where appropriate, a data transformation can be applied that translates non-numerically formatted parameters to numerically formatted parameters. For example, non-numerical parameters from Table 2 can be transformed into numerical parameters as shown in Table 3.

TABLE 3

| vCpu Count | osName | reserved Memory GB | memory GB | Reserved CpuGhz | Fault Tolerant | Nic Count | Thin Provisioned | Tenure (days) |
| --- | --- | --- | --- | --- | --- | --- | --- | --- |
| 4 | 0 | 2 | 8 | 2 | 0 | 2 | 1 | 2 |
| 2 | 1 | 0 | 4 | 1 | 1 | 1 | 1 | 4 |
| 1 | 1 | 0 | 2 | 0 | 0 | 2 | 0 | 1 |
| 4 | 0 | 2 | 8 | 0 | 0 | 2 | 1 | 10 |
| 2 | 0 | 2 | 16 | 1 | 1 | 1 | 0 | 30 |
| 1 | 1 | 1 | 2 | 0 | 0 | 1 | 0 | 6 |

In step 206, the management service 116 can train machine learning models 117. The management service 116 can train the machine learning model 117 based on a training set of the workloads 149. Using the specific case of an SVM regression model, input X can be mapped onto a n-dimensional feature space using fixed mapping, and a linear model can be constructed in this feature space. Using mathematical notation, the linear model in the n-dimensional feature space $f(x, \omega)$ can be:

$$f(x, \omega) = \sum_{j=1}^{n} \omega_j g_j(x) + b$$

$g_j(x)$, $j=1, \ldots, n$ is a set of nonlinear transformations of the model function 146, and b is a bias term. The data can be preprocessed to have a zero mean, and the bias term can be dropped. An SVM regression model can be implemented in any programming language.

The SVM regression model can find a model function 146 that results in predicted tenures 140 with minimum deviation from measured tenures 135 by a value no greater than c for each training point, where ε is a margin of tolerance.

In step 209, the management service 116 can select a machine learning model 117 with a minimum error. For example, the management service 116 can train a number of the machine learning models 117 using the training set of workloads 149. The management service 116 can then assess the accuracy of each of the trained machine learning models 117. For example, the management service 116 can determine an average error, median error, mode error, or another value for each model function 146 using the training set of workloads 149. The error can refer to a difference between predicted tenure 140 and the measured tenure 135. In some cases, the management service 116 can confirm that the error of the selected machine learning model 117 is below a predetermined threshold before continuing to step 213. If the error is above the predetermined training threshold, the management service 116 can move to step 203 to collect additional parameters for workloads 149 over a longer period of time. The management service 116 can also train and test additional or different machine learning models 117.

In step 213, the management service 116 can confirm accuracy of the selected machine learning model 117. The accuracy of the selected machine learning model can be confirmed using a validation set of the workloads 149. The validation set of workloads 149 can be a different set of the workloads 149 than the training set. If the error is above the predetermined threshold, the management service 116 can move to step 203 to collect workload parameters for additional time. The management service 116 can also train and test additional or different machine learning models 117. If the error is above the predetermined threshold, the management service 116 can move to step 216.

In step 216, the management service 116 can determine whether a new workload 149 is configured. A new workload 149 can be configured by a user through a user interface of the management service 116. For example, the user can manually enter a number of parameters for the new workload 149, or can select a particular preconfigured workload 149. Once a preconfigured workload 149 is selected, the user interface can include elements that, when selected, allow the user to modify or customize particular parameters of the workload 149. In addition, where a user manually enters a number of parameters for the new workload 149, additional parameters can be automatically generated or suggested by the management service 116. If a new workload 149 is not being configured, the management service 116 can move to step 203 to collect workload parameters for additional time. This continually updated technique can help to increase accuracy of the machine learning models 117.

In step 225, the management service 116 can determine a predicted tenure 140 for the new workload 149. Select a workload group 130 for the new workload 149 based on the machine learning model 117 and the parameters of the new workload 149. For example, the parameters of the new workload 149 can be input into the model function 146 in order to generate a predicted tenure 140 for the new workload 149. Alternatively, the management service 116 can associate or classify the new workload 149 as a member of a particular workload group 130 based on the machine learning model 117. The workloads 149 of the particular workload group 130 can be analyzed to determine a predicted tenure 140 for the new workload 149. An average, median, mode, or another predicted tenure 140 can be calculated for the new workload 149 based on the measured tenures 135 of workloads 149 in the workload group 130.

In step 228, the management service 116 can generate a user interface that includes capacity planning metrics 143 based on current workloads 149, the new workload 149, and the predicted tenure 140 for the new workload 149. The predicted tenure 140 can be utilized to generate capacity planning metrics 143 such as resource demands, expected available capacities, resource shortfalls, and other metrics. The capacity planning metrics 143 can be utilized to generate graphs and other visual representations of the capacity planning metrics 143. The graphs can generate the graphs and other visual representations before the new workload is actually implemented or deployed to a host machine 106. The predicted tenure 140 can be particularly useful to forecast resource demands and for one or more new workloads 149. Planned or scheduled future capacity can be compared with the forecasted resource demands to determine forecasted shortfall or excess resources. This more accurate information can make the management service 116 and management device 103 more efficient to use than previous technologies, which can overestimate demand by failing to account for tenure.

In step 231, the management service 116 can add the new workload 149 to a host machine 106. An administrator or another user can examine the graphs or other visual indications in the user interface of the management service 116. Once the user is satisfied with the capacity planning metrics 143, the administrator can select a user interface element that causes the management service 116 to deploy the new workload 149 to a host machine 106, for example, by assigning a hypervisor 156 to execute the new workload 149. The management service 116 can select a particular host machine 106 by determining that the available hardware resources 153 of the host machine 106 match the requirements of the workload parameters of the new workload 149.

Figure 3:
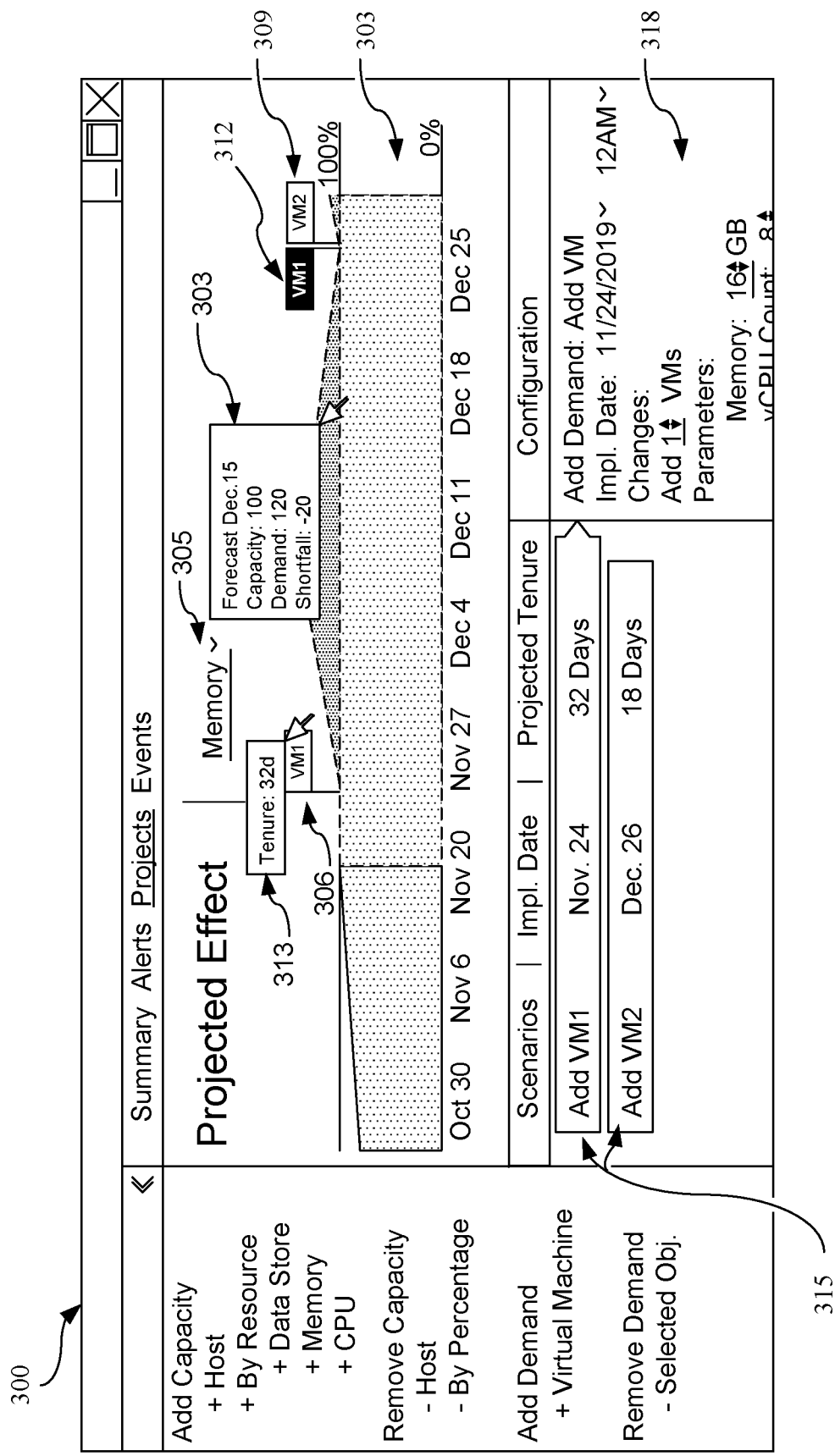
FIG. 3 is an example of a user interface rendered by components of the networked environment according to various embodiments of the present disclosure.

FIG. 3 depicts an example of a user interface 300 generated by the management service 116. As illustrated, the user interface 300 can include an area with capacity planning metrics 143. The capacity planning metrics 143 can include past capacity planning metrics 143, current capacity planning metrics 143, and forecasted capacity planning metrics 143. Each of the capacity planning metrics 143 can include a capacity, demand, and shortfall (or excess) for a resources of an SDDC. In response to hovering a cursor over a particular location, the user interface 300 can generate a user interface element 303 that indicates a capacity, demand, and shortfall (or excess) for a date corresponding to the cursor location.

A user interface element 305 can cause a selected resource to be displayed in the graph or other visualization. User interface elements or workload indicators 306 and interface elements 309 can indicate, in the visualization area, an implementation date for a particular workload 149, such as VM1 and VM2, respectively. Another user interface element 312 can indicate a predicted end or completion date for VM1. The predicted completion date can be determined based on the implementation date and the predicted tenure 140 for VM1, based on inputting its configured parameters into a trained machine learning model. The predicted tenure 140 for each new workload 149 can also be shown in the user interface 300. For example, hovering a cursor over a particular workload indicator, or selection of the workload indicator, can cause a user interface element 313 to be shown in the visualization area.

The user interface 300 can also include one or more user interface elements 315. The user interface element 309 can correspond to a new workload 149, or a workload that is not yet implemented in the SDDC. A selection of the user interface element 309 can cause the management service 116 to include the new workload 149 in the capacity planning metrics 143. In some cases, a user can select the user interface element 309 using a click or double-click, or by dragging and dropping the user interface element 309 into the visualization area. Each user interface element 315 can identify the projected tenure 140 for the corresponding workload 149.

A configuration panel 318 can include user interface elements that allow a user to configure workload parameters of a new workload 149. The user interface elements can allow a user to enter or modify an implementation date, a number of workloads or virtual machines to add at the implementation date, and the workload parameters of the new workload 149.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the management service 116, hypervisor 156, other services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions on an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable mediums include solid-state drives or flash memory. Further, any logic or application described herein, can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system comprising:
  at least one computing device comprising at least one processor and at least one data store;
  machine readable instructions stored in the at least one data store, wherein the instructions, when executed by the at least one processor, cause the at least one computing device to at least:
    identify workload data for a plurality of workloads of a software defined data center, the workload data for a respective workload comprising: a measured tenure, and at least one identified workload parameter;
    train a plurality of machine learning models to determine a predicted tenure based on the measured tenure and the at least one identified workload parameter;

receive a user input to configure a workload for the software defined data center, the workload comprising at least one workload parameter;
determine that a machine learning model comprises a minimum error among the plurality of machine learning models;
select the machine learning model to process the workload;
process the workload using the machine learning model to determine the predicted tenure for the workload, an input to the machine learning model comprising the at least one workload parameter; and
render, within a user interface, a demand graph for the software defined data center, the demand graph being generated based on the predicted tenure for the workload.

2. The system of claim 1, wherein the at least one workload parameter comprises an implementation time, and the demand graph is generated based on: the predicted tenure for the workload, and the implementation time.

3. The system of claim 1, wherein the machine learning model comprises a support vector machine (SVM) regression model.

4. The system of claim 1, wherein the workload data is identified using a data structure or a file received from at least one host machine that executes the plurality of workloads.

5. The system of claim 1, wherein the at least one identified workload parameter comprises at least one identified software parameter.

6. The system of claim 5, wherein the at least one identified software parameter comprises: an operation system identifier, a fault tolerance indication, and a thin provisioning indication.

7. The system of claim 1, wherein the at least one identified workload parameter comprises at least one of: a number of virtual central processing units (vCPUs) for the respective workload, a memory capacity for the respective workload, a memory reservation for the respective workload, a number of network cards for the respective workload, and a central processing unit (CPU) reservation for the respective workload.

8. A method comprising:
identifying workload data for a plurality of workloads of a software defined data center, the workload data for a respective workload comprising: a measured tenure, and at least one identified workload parameter;
training a plurality of machine learning models to determine a predicted tenure based on the measured tenure and the at least one identified workload parameter;
receiving a user input to configure a workload for the software defined data center, the workload comprising at least one workload parameter;
determining that a machine learning model comprises a minimum error among the plurality of machine learning models;
selecting the machine learning model to process the workload;
processing the workload using the machine learning model to determine the predicted tenure for the workload, an input to the machine learning model comprising the at least one workload parameter; and
rendering, within a user interface, a demand graph for the software defined data center, the demand graph being generated based on the predicted tenure for the workload.

9. The method of claim 8, wherein the at least one workload parameter comprises an implementation time, and the demand graph is generated based on: the predicted tenure for the workload, and the implementation time.

10. The method of claim 8, wherein the machine learning model comprises a support vector machine (SVM) regression model.

11. The method of claim 8, wherein the workload data is identified using a data structure or a file received from at least one host machine that executes the plurality of workloads.

12. The method of claim 8, wherein the at least one identified workload parameter comprises at least one identified software parameter.

13. The method of claim 12, wherein the at least one identified software parameter comprises: an operation system identifier, a fault tolerance indication, and a thin provisioning indication.

14. The method of claim 8, wherein the at least one identified workload parameter comprises at least one of: a number of virtual central processing units (vCPUs) for the respective workload, a memory capacity for the respective workload, a memory reservation for the respective workload, a number of network cards for the respective workload, and a central processing unit (CPU) reservation for the respective workload.

15. A non-transitory computer-readable medium comprising machine readable instructions, wherein the instructions, when executed by at least one processor, cause at least one computing device to at least:
identify workload data for a plurality of workloads of a software defined data center, the workload data for a respective workload comprising: a measured tenure, and at least one identified workload parameter;
train a plurality of machine learning models to determine a predicted tenure based on the measured tenure and the at least one identified workload parameter;
receive a user input to configure a workload for the software defined data center, the workload comprising at least one workload parameter;
determine that a machine learning model comprises a minimum error among the plurality of machine learning models;
select the machine learning model to process the workload;
process the workload using the machine learning model to determine the predicted tenure for the workload, an input to the machine learning model comprising the at least one workload parameter; and
render, within a user interface, a demand graph for the software defined data center, the demand graph being generated based on the predicted tenure for the workload.

16. The non-transitory computer-readable medium of claim 15, wherein the at least one workload parameter comprises an implementation time, and the demand graph is generated based on: the predicted tenure for the workload, and the implementation time.

17. The non-transitory computer-readable medium of claim 15, wherein the machine learning model comprises a support vector machine (SVM) regression model.

18. The non-transitory computer-readable medium of claim 15, wherein the workload data is identified using a data structure or a file received from at least one host machine that executes the plurality of workloads.

19. The non-transitory computer-readable medium of claim 15, wherein the at least one identified workload parameter comprises at least one identified software parameter.

20. The non-transitory computer-readable medium of claim 19, wherein the at least one identified software parameter comprises: an operation system identifier, a fault tolerance indication, and a thin provisioning indication.

* * * * *